(12) United States Patent
Tourbabin et al.

(10) Patent No.: US 11,671,756 B2
(45) Date of Patent: Jun. 6, 2023

(54) AUDIO SOURCE LOCALIZATION

(71) Applicant: Meta Platforms Technologies, LLC, Menlo Park, CA (US)

(72) Inventors: Vladimir Tourbabin, Sammamish, WA (US); Jacob Ryan Donley, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 335 days.

(21) Appl. No.: 16/997,778

(22) Filed: Aug. 19, 2020

(65) Prior Publication Data

US 2022/0060820 A1 Feb. 24, 2022

(51) Int. Cl.
| | |
|---|---|
| *H04R 3/00* | (2006.01) |
| *G01S 3/803* | (2006.01) |
| *G01S 3/808* | (2006.01) |
| *G10L 15/28* | (2013.01) |
| *H04R 1/08* | (2006.01) |
| *H04R 29/00* | (2006.01) |

(52) U.S. Cl.
CPC .............. *H04R 3/005* (2013.01); *G01S 3/803* (2013.01); *G01S 3/808* (2013.01); *G10L 15/28* (2013.01); *H04R 1/08* (2013.01); *H04R 29/005* (2013.01); *H04R 2410/00* (2013.01)

(58) Field of Classification Search
CPC ........... G16H 50/20; G06F 3/14; G10L 25/66; A61B 7/026; A61B 7/04; A61B 2562/028; H04R 1/04; H04R 1/46; H04R 1/406; H04R 3/005; H04R 19/04; H04R 2201/003; H04R 2201/401

USPC ...................... 381/56, 58, 67, 122, 124, 150
See application file for complete search history.

(56) References Cited

PUBLICATIONS

Ogawa, 2009, Direction-of-Arrival estimation under noisy condition using four-line omni-directional microphone mounted on a robot head, p. 879-883.*

Ogawa, Direction-of-Arrival estimation under noisy condition using four-line Omni-directional microphone mounted on a robot head, p. 879-883 (Year: 2009).*

Evers et al., "Source tracking using moving microphone arrays for robot audition," 2017 IEEE International Conference on Acoustics, Speech and Signal Processing (ICASSP), New Orleans, LA, 2017, pp. 1-pp. 5.

(Continued)

*Primary Examiner* — William A Jerez Lora
(74) *Attorney, Agent, or Firm* — Lee & Hayes, P.C.

(57) ABSTRACT

An electronic device localizes an audio source by normalizing an amplitude of an audio signal over a time period. The electronic device receives, from one or more microphones of the electronic device, signal(s) representative of audio emitted by an audio source over a time period. The electronic device estimates amplitudes of the signal(s) at a first time within the time period and at a second time within the time period, where the second time is different from the first time. The electronic device normalizes the amplitudes associated with the first and second times to generate normalized amplitudes. The electronic device determines a combined amplitude representative of the audio emitted by the audio source by combining the normalized amplitudes. The electronic device determines, based at least in part on the combined amplitude and motion of the electronic device, an estimated position of the audio source relative to the electronic device.

20 Claims, 7 Drawing Sheets

(56) References Cited

PUBLICATIONS

Tourbabin et al., "Direction of Arrival Estimation Using Microphone Array Processing for Moving Humanoid Robots," in IEEE/ACM Transactions on Audio, Speech, and Language Processing, vol. 23, No. 11, pp. 2046-2058. Nov. 2015. pp. 1-pp. 14.
International Search Report and Written Opinion for International Application No. PCT/US2021/044055, dated Dec. 1, 2021, 12 pages.
Ogawa T., et al., "Direction-of-Arrival Estimation Under Noisy Condition using Four-Line Omni-Directional Microphones Mounted on a Robot Head," 17th European Signal Processingconference, IEEE, Aug. 24, 2009, pp. 879-883.

\* cited by examiner

AUDIO SOURCE LOCALIZATION

FIELD OF THE INVENTION

The present disclosure generally relates to an audio system in an electronic device, and specifically relates to localization of an audio source using one or more moving microphones.

BACKGROUND

Many computing devices include a microphone or a microphone array for capturing sounds in an environment surrounding a computing device. After a microphone captures audio, the computing device may perform a variety of processing operations on the audio, such as identifying a particular audio source and/or modifying the audio emitted by a particular audio source (e.g., amplifying, suppressing, removing, etc.). To perform many of these processing operations on the audio, it can be helpful for the computing device to have an estimate of a location of the audio source, such as relative to the computing device and/or the microphone(s) that captured the audio. However, determining an accurate location of an audio source presents challenges, especially when characteristics of the audio signal are highly variable, as in the case of speech.

SUMMARY

An audio system is described herein. The audio system is configured to localize an audio source relative to an electronic device and/or one or more microphones of an electronic device, including when the audio source has a varying source amplitude. In some examples, the audio system may modify audio signals observed by the microphone(s) such that the amplitude associated with a particular audio source is normalized over a time period and therefore substantially constant, while the directional information associated with the particular audio source remains intact. Accordingly, the audio system can apply audio processing operations that rely on a stationary (e.g., constant amplitude) audio signal subsequent to the normalization, such as operations that leverage microphone array motion to enhance performance of audio source localization. In some cases, the audio system may use the described normalization techniques to locate highly variable audio signals such as speech without sacrificing performance of post-processing operations.

In some examples, an audio system receives, from a microphone of an electronic device, a signal representative of audio emitted by an audio source over a time period. The audio system estimates a first amplitude associated with the signal for a first time within the time period, and estimates a second amplitude associated with the signal for a second time within the time period, where the second time is different than the first time. The audio system normalizes the signal at the first time by the first amplitude to determine a first normalized signal (e.g., normalized amplitude of the signal at the first time) and normalizes the signal at the second time by the second amplitude to determine a second normalized signal (e.g., normalized amplitude of the signal at the second time). In examples, the audio system determines a combined amplitude representative of the audio emitted by the audio source by combining the first normalized amplitude and the second normalized amplitude. The electronic device determines, based at least in part on the combined amplitude, an estimated position of the audio source relative to the electronic device.

In some examples, an electronic device that localizes an audio signal is disclosed. The electronic device may include one or more microphones. In some examples, the electronic device includes a microphone array that includes at least a first microphone and a second microphone, one or more processors, and one or more computer-readable media storing instructions that, when executed by the one or more processors, perform operations. The operations may include receiving, from the first microphone, a first signal representative of audio emitted by an audio source over a time period, and receiving, from the second microphone, a second signal representative of the audio emitted by the audio source over the same time period. In examples, the operations include estimating a first representative amplitude of the audio based at least in part on the first signal and the second signal associated with a first time within the time period. The operations may further include estimating a second representative amplitude of the audio based at least in part on the first signal and the second signal associated with a second time within the time period, where the second time is different than the first time. The operations may also include normalizing the first signal and the second signal by the first representative amplitude to determine a first normalized amplitude, and normalizing the first signal and the second signal by the second representative amplitude to determine a second normalized amplitude. In some examples, the operations include determining a combined amplitude representative of the audio emitted by the audio source by combining the first normalized amplitude and the second normalized amplitude. Further, the operations may include determining, based at least in part on the combined amplitude, an estimated position of the audio source relative to a device that includes the microphone.

Figure 1:
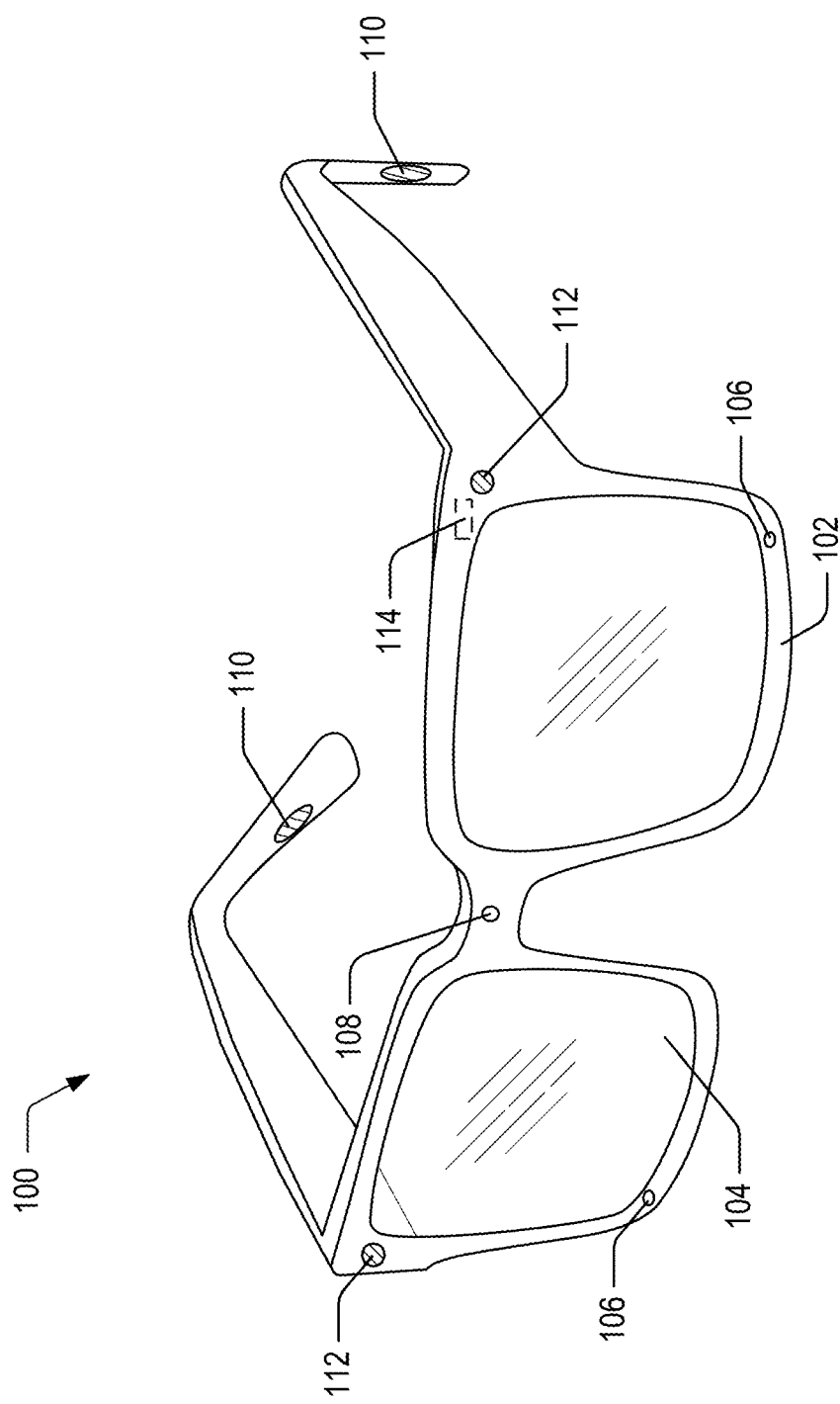
FIG. 1 is a perspective view of an example electronic device, implemented as an eyewear device, that includes an audio system configured to localize an audio source, in accordance with one or more examples.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

As discussed above, it can be helpful for an electronic device to have an estimate of a location of an audio source in order to perform processing operations on the audio. Many electronic devices are capable of being moved throughout an environment, such as augmented reality (AR) and/or virtual reality (VR) devices, hearing aids, mobile devices, vehicles, and so forth. In some examples, motion of an electronic device may be used to improve localization estimates of audio sources. However, localization of non-stationary (in amplitude) audio sources by relying upon motion of an electronic device may present challenges in some cases. Accordingly, the described techniques normalize audio signals to provide a stationary signal for motion-based localization enhancement.

An audio system localizes an audio source by normalizing a non-stationary audio signal over time. As used herein, "stationary" and "non-stationary" refer to an amplitude of a signal, unless otherwise noted. Generally, a stationary audio signal corresponds to a constant tone, while non-stationary audio signal comprises audio that is not a constant tone, such as speech, music, and so forth. In effect, the audio system creates a stationary (e.g., constant or near-constant amplitude) audio signal by normalizing the audio signal received by one or more microphones. In some examples, the audio system may determine an amplitude of an audio signal in multiple time segments (e.g., frames lasting 8 milliseconds, 12 milliseconds, 16 milliseconds, etc.), then normalize the audio signal based on a representative amplitude across multiple time units such that the normalized audio signal is more stationary than the audio signal received from the microphone(s). Additionally, the audio system may combine the normalized signal into a larger, longer frame (e.g., 0.5 seconds, 1 second, etc.) for a more stationary signal across the longer duration. The audio system may use the combined frame of normalized audio signals to localize the audio signal, such as using techniques employed by conventional systems that rely on stationary signals to perform localization and could not previously localize non-stationary signals.

Accordingly, techniques such as leveraging a moving microphone array can be employed with greater accuracy to localize audio signals, regardless of whether an amplitude of the audio signal is stationary. The audio systems described herein may be included in electronic devices that capture sounds (e.g., via one or more microphones) to determine a location of an audio source in the environment relative to the electronic devices. Examples of electronic devices include, but are not limited to, wearable devices (e.g., glasses, headsets, helmets, hearing aids, etc.), mobile devices (e.g., phones, tablets, etc.), video game systems or controllers, vehicles, or other portable or stationary electronic devices.

Examples of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset (e.g., head-mounted display (HMD) and/or near-eye display (NED)) connected to a host computer system, a standalone headset, a mobile device or electronic device or system, or any other hardware platform capable of providing artificial reality content to one or more viewers.

System Overview

FIG. 1 is a perspective view of a headset 100, implemented as an eyewear device, configured to localize an audio source in accordance with the techniques described herein. In some examples, the eyewear device is a near eye display (NED). In general, the headset 100 may be worn on the face of a user such that content (e.g., media content) is presented using a display assembly and/or an audio system. Examples are also considered in which the headset 100 presents media content to a user in a different manner. Examples of media content presented by the headset 100 include one or more images, video, audio, or some combination thereof. The headset 100 includes a frame 102, and may include, among other components, a display assembly including one or more display elements 104, a depth camera assembly (DCA), and an audio system. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 102 may hold the other components of the headset 100. In some examples, the frame 102 includes a front portion that holds the one or more display elements 104, and end pieces (e.g., temples) to attach the headset 100 to a head of the user. In some cases, the front portion of the frame 102 bridges the top of a nose of the user. The length of the end pieces may be adjustable (e.g., adjustable temple length) to fit different users. The end pieces may also include a portion that curls behind the ear of the user (e.g., temple tip, ear piece, etc.).

The one or more display elements 104 may emit light visible to a user wearing the headset 100. As illustrated, the headset 100 includes a display element 104 for each eye of a user, although other configurations of the display elements are also considered. In some examples, a display element 104 generates image light that is provided to an eyebox of the headset 100. The eyebox may correspond to a location in space that an eye of user occupies while wearing the headset 100. For example, a display element 104 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In examples, the display elements 104 may use one or more diffraction gratings to perform in-coupling and/or outcoupling of light from the one or more waveguides. In some examples, the waveguide display includes a scanning element (e.g., waveguide, mirror, etc.) that scans light from the light source as the light is in-coupled into the one or more waveguides. In some cases, one or both of the display elements 104 are opaque and do not transmit light from a local area or environment around the headset 100 through the display elements 104 to the eyebox. For example, the local area may be a room that a user wearing the headset 100 is inside, or the user wearing the headset 100 may be outside and the local area is an outside area. In cases in which the display elements 104 are opaque, the headset 100 may generate VR content to be viewed via the display elements 104. Examples are also considered in which one or both of the display elements 104 are at least partially transparent, such that light from the local area may be combined with light from the one or more display elements 104 to produce AR and/or MR content.

In some examples, a display element 104 is a lens that transmits light from the local area to the eyebox. For instance, one or both of the display elements 104 may be a lens without correction (non-prescription) or a prescription lens (e.g., single vision, bifocal and trifocal, or progressive) to help correct for defects in a user's eyesight. In some examples, the display element 104 may be polarized and/or tinted to protect the user's eyes from the sun.

In some examples, the display element 104 may include an optics block (not shown). The optics block may include one or more optical elements (e.g., lens, Fresnel lens, etc.) that direct light from the display element 104 to the eyebox. The optics block may, in some cases, correct for aberrations in some or all of the image content, magnify some or all of the image, or some combination thereof.

The DCA may determine depth information for a portion of a local area surrounding the headset 100. In examples, the DCA includes one or more imaging devices 106, a DCA controller (not shown in FIG. 1), and an illuminator 108. In some examples, the illuminator 108 illuminates a portion of the local area with light. The light may be, for instance, structured light (e.g., dot pattern, bars, etc.) in the infrared (IR), IR flash for time-of-flight, and so forth. In some examples, the one or more imaging devices 106 capture images of the portion of the local area that include the light from the illuminator 108. The example headset 100 includes a single illuminator 108 and two imaging devices 106, but alternate configurations including differing numbers of illuminators and/or imaging devices are also considered.

The DCA controller may compute depth information for at least a portion of the local area using captured images and one or more depth determination techniques. The DCA controller may utilize depth determination techniques such as, but not limited to, direct time-of-flight (ToF) depth sensing, indirect ToF depth sensing, structured light, passive stereo analysis, active stereo analysis (e.g., using texture added to the scene by light from the illuminator 108), other technique(s) to determine depth of a scene, or some combination thereof. In some examples, the headset 100 may perform simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some examples, some or all of the imaging devices 106 of the DCA may also function as the PCA. The images captured by the PCA and the depth information determined by the DCA may be used by the headset 100 to determine parameters of the local area, generate a model of the local area, update a model of the local area, or some combination thereof. In some examples, the headset 100 may include one or more sensor arrays 110 that generate measurement signals in response to motion of the headset 100 and tracks the position (e.g., location and pose) of the headset 100 within the room.

The sensor array(s) 110 may include, for example, an optical displacement sensor, an inertial measurement unit, an accelerometer, a gyroscope, or another suitable type of sensor that detects motion, or some combination thereof.

In some examples, the headset 100 includes an audio system (described in detail in relation to FIG. 3) that includes a microphone array 112 and an audio controller 114. The microphone array 112 may include one or more directional and/or omnidirectional microphones. For instance, a directional microphone may have increased sensitivity to sounds arriving from a particular direction relative to the microphone, while an omnidirectional microphone is generally uniform in capturing sounds from any direction. The microphone array 112 may be located on an exterior surface of the headset 100, on an interior surface of the headset 100, separate from the headset 100 (e.g., part of some other device), or some combination thereof. The number and/or locations of microphone array(s) 112 may be different from what is shown in FIG. 1. For example, the number of locations of microphone arrays 112 may be increased to increase the amount of audio information collected, the sensitivity of the microphones, and/or accuracy of the information collected by the microphones. The audio system is not limited to the microphone array 112 and/or the audio controller 114 described, and in some cases, may include different and/or additional components. Additionally, in some examples, functionality described with reference to the components of the audio system can be distributed among various components differently than as described in relation to FIG. 1. For example, some or all of the functions of the audio controller 114 may be performed by a remote server.

In examples, the microphone(s) included in the microphone array 112 capture audio emitted in the local area, convert the audio into an electrical audio signal, and transmit the electrical audio signals (referred to herein as "audio signal(s)") corresponding to the audio in the local area to the audio controller 114. As described in more detail in relation to FIG. 4, the audio controller 114 may determine one or more amplitudes associated with frequencies included in the audio signal for multiple times within a time period. For example, the audio controller 114 may use a transform, such as a short-time Fourier transform (STFT) to divide a time period of the audio signal (e.g., continuously as the audio signal is received) into segments (e.g., frames lasting 8 milliseconds, 12 milliseconds, 16 milliseconds, etc.). The audio controller 114 may then compute a Fourier transform separately on each segment as part of the STFT to determine the Fourier spectrum on each of the segments. In some examples, the audio controller 114 may generate spectrograms for each segment, which may include frequency (x-axis) versus amplitude (y-axis) for each segment. Alternatively or additionally, the audio controller 114 may use a beamforming technique to select a frequency (and/or range of frequencies) from the audio signals present in the local area and received by the microphone array 112, and determine an amplitude of the selected frequency.

The audio controller 114 may then generate normalized amplitudes corresponding to individual ones of the time segments. For instance, consider an example in which the microphone array 112 includes three microphones. Each of the three microphones in the microphone array 112 receives audio emitted by an audio source in a local area of the headset 100, but due to characteristics of each of the three microphones, differing locations of the three microphones, differing angles of the three microphones, and the like, may each experience the audio emitted by the audio source slightly differently. Additionally, as described above, many audio signals are non-stationary in amplitude over time. Therefore, the audio controller 114 may determine a "representative" amplitude over a time segment by leveraging the audio signal received at individual ones of the microphone(s) in the microphone array 112, the transfer function applied to an instantaneous direction of arrival (DOA) associated with the audio signals, and the number of microphones used to capture the audio. To generate a normalized amplitude, the audio controller 114 may divide the cumulative audio signals received from each of the microphone(s) during a time segment by the representative amplitude associated with the microphone(s) that captured the audio signal over the time segment.

In some examples, the audio controller 114 may determine a combined amplitude across multiple time segments, generating a longer frame made up of multiple time segments. Continuing with the three-microphone example above, the audio controller 114 may combine a first vector having three elements, one element for each of the microphones, for the first time segment with a second vector having three corresponding elements, to generate a third vector having six elements. The resulting frame that includes the combined time segment vectors may be 0.25 seconds, 0.5 seconds, 1 second, or the like, versus the 8-16 millisecond time segments, depending on the number of time segments included in the larger frame and the duration of the individual time segments included in the larger frame. In examples, the audio controller 114 uses the frame that includes multiple time segment vectors to localize the normalized audio (e.g., more stationary than the original audio signal) included in the frame. For example, the audio controller 114 may more accurately determine a location of the audio source using information about how the microphone array 112 is moving in space when the source audio signal is generally stationary (e.g., in amplitude, determined according to the described techniques).

In addition to the functionality described above, the audio controller 114 may be configured to generate direction of arrival (DOA) estimates, generate acoustic transfer functions (e.g., array transfer functions and/or head-related transfer functions), track the location of sound sources, form beams in the direction of sound sources, classify sound sources, optimize performance of the microphone array 112, and the like.

Figure 2:
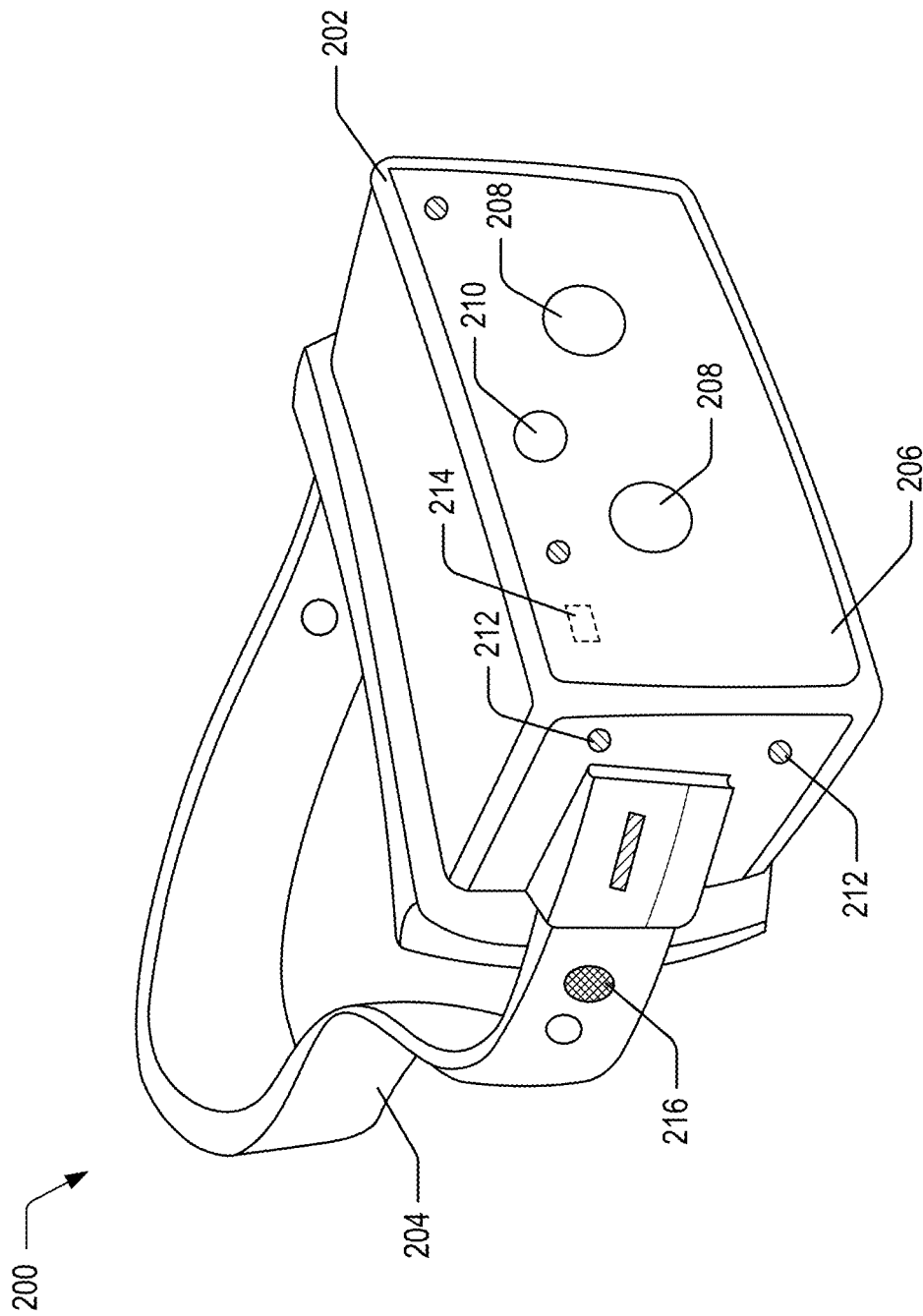
FIG. 2 is a perspective view of another example electronic device, implemented as a head-mounted display, that includes an audio system configured to localize an audio source, in accordance with one or more examples.

FIG. 2 is a perspective view of a headset, implemented as a head-mounted display (HMD) 200, configured to localize an audio source, in accordance with one or more examples. In examples, portions of a front side of the HMD 200 are at least partially transparent in the visible band (e.g., ~380 nm to 750 nm), and portions of the HMD 200 that are between the front side of the HMD 200 and an eye of the user are at least partially transparent (e.g., a partially transparent electronic display). The HMD 200 includes a front rigid body 202 and a band 204. In some examples, the HMD 200 includes some or all of the same components described above with reference to FIG. 1, which may be modified to integrate with the form factor of the HMD 200. For example, the HMD 200 may include a display assembly 206, a DCA, and an audio system. Additionally, in examples, the HMD 200 includes one or more imaging devices 208, an illuminator 210, one or more microphone array(s) 212, an audio controller 214, and one or more displacement sensors 216. Different components may be located in various locations, such as coupled to the band 204, coupled to the front rigid body 202, or may be configured to be inserted within the ear canal of a user, to name a few examples.

Audio System for Audio Source Localization

Figure 3:
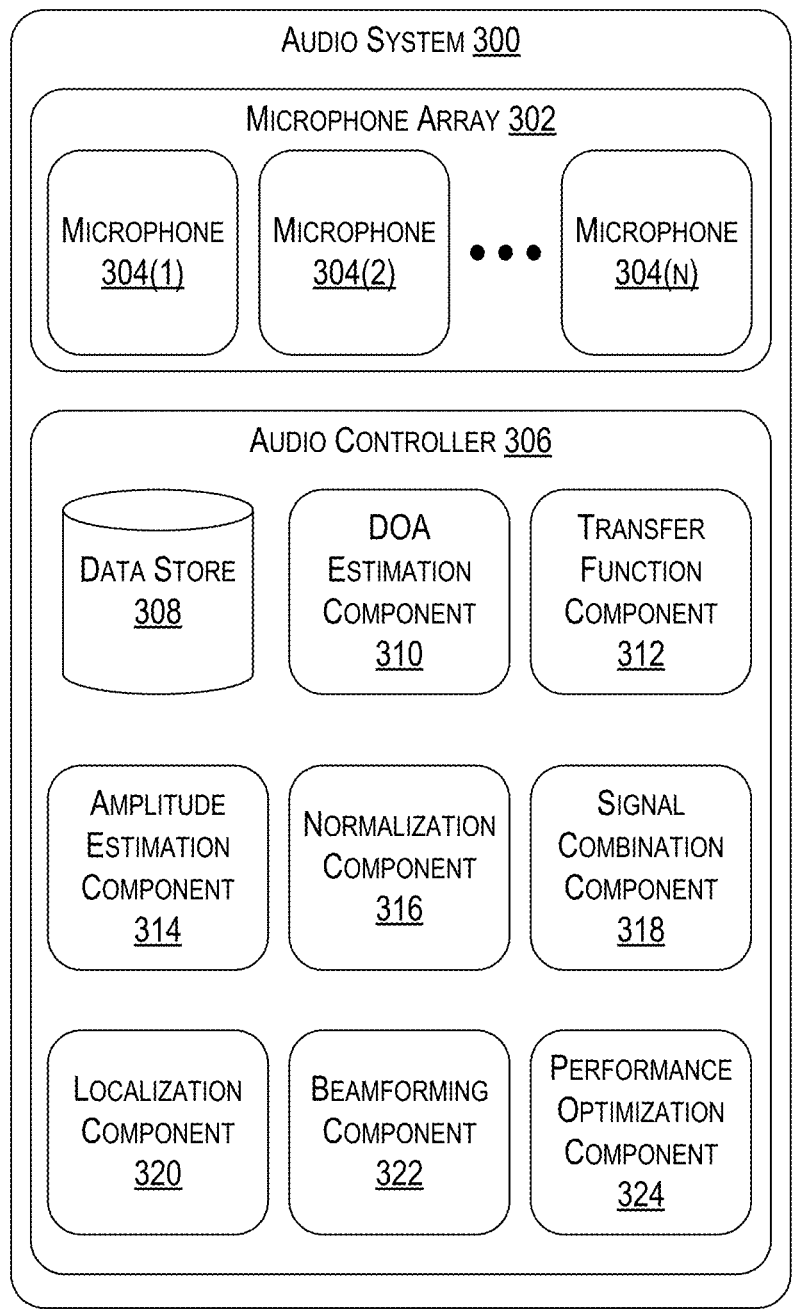
FIG. 3 is a block diagram of an example audio system which may be included in or used in association with an electronic device, in accordance with one or more examples.

FIG. 3 is a block diagram of an audio system 300, in accordance with one or more examples. The audio system 300 may be implemented in an electronic device, such as the headset 100 of FIG. 1 and/or the HMD 200 of FIG. 2, although other types of electronic devices may implement the audio system as well, such as hearing aids, mobile devices, tablets, vehicles, and so on. The audio system 300 receives audio from a local area of an environment surrounding one or more devices in which the audio system 300 is incorporated, such as the headset 100 and/or the HMD 200. In some examples, the audio system 300 generates a normalized audio signal based at least in part on a representative amplitude over time segments, where the normalized audio signal may be more stationary than the original audio signal received at a microphone of the audio system 300. The audio system 300 may then use the normalized audio signal to localize the audio source associated with the audio signal more accurately and efficiently than conventional techniques by assuming, for localization, that the audio signal as normalized is generally stationary. In examples, the audio system 300 includes at least one microphone array 302 comprising a microphone 304(1), a microphone 304(2), . . . a microphone 304(n) (collectively, microphones 304). The microphones 304 may be configured to detect acoustic pressure waves from sound in a local area of an environment around the microphones 304 and convert the detected acoustic pressure waves into an analog and/or digital format.

Additionally, the audio system 300 may include an audio controller 306, which may correspond to the audio controller 114 and/or the audio controller 214 described above. The audio controller 306 processes data (e.g., audio signals) received from the microphone array 302 to localize audio signals and perform additional processing operations on the audio signals prior to providing the processed audio to a user (e.g., via a speaker). In some examples, the audio controller 306 includes a data store 308, a direction of arrival (DOA) estimation component 310, a transfer function component 312, an amplitude estimation component 314, a normalization component 316, a signal combination component 318, a localization component 320, a beamforming component 322, and a performance optimization component 324. In some cases, the audio controller 306 includes other modules and/or components than those described herein.

The data store 308 may store data relevant to the audio system 300. For example, the data store 308 may store information related to the characteristics of the microphones 304 included in the microphone array 302, data relating to frequencies and associated amplitudes of past time segments and/or combined frames, performance thresholds for optimization of performance of the microphone array 302, and the like. In addition, data in the data store 308 may include sounds recorded in the local area of the audio system 300, audio content, head-related transfer functions (HRTFs), transfer functions for one or more sensors, array transfer functions (ATFs) for one or more acoustic sensors, sound source locations, a virtual model of the local area, direction of arrival estimates, sound filters, and other data relevant for use by the audio system 300, or any combination thereof.

The DOA estimation component 310 may be configured to estimate locations of sound sources in the local area of the environment based in part on information from the microphone array 302. While the DOA estimation component 310 and the localization component 320 are shown as separate elements in FIG. 3, in some cases, the functions of these components may be performed by a common component or any number of one or more components. In some examples, the DOA estimation component 310 may analyze the intensity, spectra, and/or arrival time of sounds at the microphone array 302 to determine an initial estimation of the direction from which the sounds originated. For example, the DOA estimation component 310 may receive input signals from the microphone array 302 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. The DOA estimation component 310 may also utilize a least mean squared (LMS) algorithm to create an adaptive filter that identifies, for example, differences in signal intensity and/or differences in time of arrival to estimate the DOA. Alternatively or additionally, the DOA estimation component 310 may convert the input signals from the microphones 304 into the frequency domain and select specific bins of the time-frequency (TF) domain to process. The DOA estimation component 310 may process the selected TF bins to determine whether a bin includes a portion of the audio spectrum with a direct path audio signal. In examples, the DOA estimation component 310 analyzes those bins having a portion of the direct-path signal to identify the angle at which the microphone array 302 received the direct-path audio signal. The DOA estimation component 310 may use the determined angle to identify the DOA for the received input signal. Other algorithms not listed above may also be used alone or in combination with the above algorithms to determine DOA.

In some examples, the DOA estimation component 310 may also determine the DOA with respect to an absolute position of the audio system 300 within the local area. The DOA estimation component 310 may receive the position of the microphone array 302 from an external system (e.g., some other component of a headset, an artificial reality console, a mapping server, a position sensor, etc.). The external system may create a virtual model of the local area, in which the local area and the position of the audio system 300 are mapped. The received position information may include a location and/or an orientation of some or all of the audio system 300 (e.g., of the microphone array 302). The DOA estimation component 310 may, in some cases, update the estimated DOA based on the received position information.

In examples, the DOA estimation component 310 generates a spatial spectrum based at least in part on the signal(s) received from the microphone array 302. The spatial spectrum may indicate an amplitude of energy arriving at the microphone array 302 from different directions (e.g., in degrees on a 360-degree scale) relative to the microphone array 302. The DOA estimation component 310 may select an amplitude from the spatial spectrum to use in determining an instantaneous DOA. For instance, the DOA estimation component 310 may select a direction that corresponds to a peak in the spatial spectrum, where the spatial spectrum is proportional to sound energy arriving from different directions and the peak indicates a probable source direction. The DOA estimation component 310 may then determine an instantaneous DOA for the signal based on the selected direction corresponding to the peak in the spatial spectrum. For instance, the DOA estimation component 310 may determine a peak in the spatial spectrum is 190 degrees from a reference location associated with the microphone array 302. The DOA estimation component 310 may define the spatial spectrum according to the following:

$$S_{t,f}(\varphi) = \left(1 - \frac{|x_{t,f}^H \cdot v_f(\varphi)|}{\|x_{t,f}^H\| \cdot \|v_f(\varphi)\|}\right)^{-1} \quad (1)$$

Where $S_{t,f}(\varphi)$ corresponds to the spatial spectrum, $x_{t,f}^H$ corresponds to the signal measured collectively by the microphones 304 in the microphone array 302, and $v_f(\varphi)$ corresponds to the transfer function. Once the DOA component 310 has compiled the spatial spectrum, the DOA component 310 may then calculate an instantaneous DOA according to the following:

$$\hat{\varphi}(t) = \arg\max\{S_{t,f}(\varphi)\} \quad (2)$$

Where $\varphi(t)$ corresponds to an instantaneous DOA (e.g., an estimated location of the sound source) for the spatial spectrum. The equations illustrated above are intended only as examples, and other techniques for determining an instantaneous DOA are also considered. Generally, a transfer function is a mathematical function giving a corresponding output value for one or more input values.

The transfer function component 312 may one or more transfer functions to the audio signal(s) received from the microphone array 302 to estimate an amplitude of the audio signal(s). For instance, the transfer function component 312 may divide an audio signal into multiple time segments, which may have a generally uniform duration (e.g., frames lasting 8 milliseconds, 12 milliseconds, 16 milliseconds, etc.). The transfer function component 312 may then perform a short-time Fourier transform (STFT) on the segments of the audio signal to transform the segments from a time domain into a frequency domain. Generally, a STFT is a Fourier transform used to determine sinusoidal frequency and phase content of local sections of a signal as the signal changes over time, by dividing a signal into shorter segments and computing a Fourier transform separately on each segment to determine the Fourier spectrum on each segment. In some cases, the transfer function component 312 may generate spectrogram (or waterfall plot) for each of the segments, which may indicate how amplitudes associated with the frequencies present in the signal change from one time segment to another. In some examples, the transfer function component 312 may determine an amplitude of a particular frequency (e.g., a speech signal) in a first time segment, in a second time segment, in a third time segment, and so forth, and may store amplitudes associated with the particular frequency in the data store 308 for use by additional components in the audio controller 306 to localize the audio signal.

In some cases, the transfer function component 312 may generate one or more additional acoustic transfer functions. Based on parameters of the detected sounds, the transfer function component 312 may generate one or more acoustic transfer functions associated with the audio system. The acoustic transfer functions may be array transfer functions (ATFs), head-related transfer functions (HRTFs), other types of acoustic transfer functions, or some combination thereof.

Generally, an ATF characterizes how a microphone 304 (1) receives a sound from a point in space. An ATF includes a number of transfer functions that characterize a relationship between the sound source and the corresponding sound received by the microphones 304 in the microphone array 302. Accordingly, the transfer function component 312 may comprise a transfer function for each of the microphones 304 corresponding to a sound source. Some examples of sound sources include, but are not limited to, someone or something generating sound in the local area of the environment, a user of the headset 100 and/or the HMD 200, components of the headset 100 and/or the HMD 200 itself, and so forth. The ATF for a particular sound source location relative to the microphone array 302 may differ from user to user due to a person's anatomy (e.g., ear shape, shoulders, etc.) that affects the sound as it travels to the person's ears. Accordingly, in examples, the ATFs of the microphone array 302 may be personalized for each user of the audio system 300.

In some examples, the transfer function component 312 determines one or more HRTFs for a user of the audio system 300. In general, an HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some examples, the transfer function component 312 may determine HRTFs for the user using a calibration process. In some cases, the transfer function component 312 may provide information about the user to a remote system. The user may adjust privacy settings to allow or prevent the transfer function component 312 from providing the information about the user to remote systems. A remote system may determine a set of HRTFs that are customized to the user using, e.g., machine learning, and may provide the customized set of HRTFs to the audio system 300.

In some examples, the amplitude estimation component 314 estimates an amplitude of one or more audio signals received from the microphones 304 based on the instantaneous DOA and the output of the transfer function component associated with the multiple time segments. For instance, the amplitude estimation component 314 may determine a frequency associated with the signal (e.g., a speech frequency) received by a microphone 304(1) in one of spectrograms associated with a first time segment, and determine an amplitude of the frequency in the first time segment. In some cases, the amplitude estimation component 314 may continue to determine amplitudes associated with the frequency received from one or more additional microphones 304(2)-304(n) for the same time segment as well. The amplitude estimation component 314 may estimate a representative amplitude across one or more microphones 304 that received the audio signal, such as according to the following:

$$\hat{s}(t) = \frac{1}{M} \sum_m \frac{x_m(t)}{v_m(\hat{\varphi}(t))} \qquad (3)$$

Where $\hat{s}(t)$ corresponds to a representative amplitude of an audio signal across the number of microphones M used to receive the signal, $x_m(t)$ corresponds to the signal measured by an individual microphone m at time segment t, and $v_m(\hat{\varphi}(t))$ corresponds to the transfer function applied to the signal selected according to the instantaneous DOA determined by the DOA estimation component 310. The amplitude estimation component 314, in some examples, determines the representative amplitude for multiple different time segments output by the transfer function component 312 based on the STFT.

The normalization component 316 may receive the representative amplitude(s) from the amplitude estimation component 314, and determine corresponding normalized signals for the time segments. For example, the normalization component 316 may normalize the signal for a first time segment by a first representative amplitude for the corresponding time first segment, normalize the signal for a second time segment by a second representative amplitude for the corresponding time second segment, and so forth. In this way, the amplitude of one or more particular frequencies of the signal for the time segment are normalized across the microphones used to receive the audio signal. In examples, the normalization component 316 may normalize the signal according to the following:

$$\bar{x}(t) = x(t)/\hat{s}(t) \qquad (4)$$

Where $\bar{x}(t)$ corresponds to the normalized signal for a microphone used to receive the audio signal, $x(t)$ corresponds to the audio signal as measured by the microphone, and $\hat{s}(t)$ corresponds to the representative amplitude, as described above. In some examples, the normalization component 316 determines normalized amplitudes for multiple different time segments corresponding to the representative amplitudes output by the amplitude estimation component 314. In some cases, the normalization component 316 stores multiple normalized amplitudes corresponding to multiple microphones for a particular time segment in a vector. The vector may include a number of elements based on the number of microphones used to receive the audio signal. For example, if three microphones were used to receive audio, the normalization component 316 may generate a frame for a particular time segment that has three elements, one element per microphone. The values represented in each of the three elements correspond to the normalized amplitude for the associated element. In other words, the vector for the three microphones may resemble [10 12 11], where 10 is the normalized amplitude for the first microphone, 12 is the normalized amplitude for the second microphone, and 11 is the normalized amplitude for the third microphone during the time segment.

In some examples, the signal combination component 318 determines a combined amplitude representative of the audio emitted by the audio source by combining multiple normalized amplitudes. For instance, the signal combination component 318 may receive a first vector of normalized amplitudes for a first time segment, a second vector of normalized amplitudes for a second time segment, and so forth. The signal combination component 318 may combine multiple vectors that include normalized amplitudes into a single vector, or frame, while retaining the normalized amplitude values within the larger vector. In an illustrative example, consider the example vector of normalized amplitudes above, [10 12 11], and another example vector of normalized amplitudes for a second time segment of [11 9 11]. The signal combination component 318 may generate an example combined vector of [10 12 11 11 9 11] based on the two example vectors. While two vectors of normalized amplitudes are illustrated as being combined in the example above, any suitable number of vectors of normalized amplitudes (of any size) are considered without departing from the present disclosure.

Figure 4:
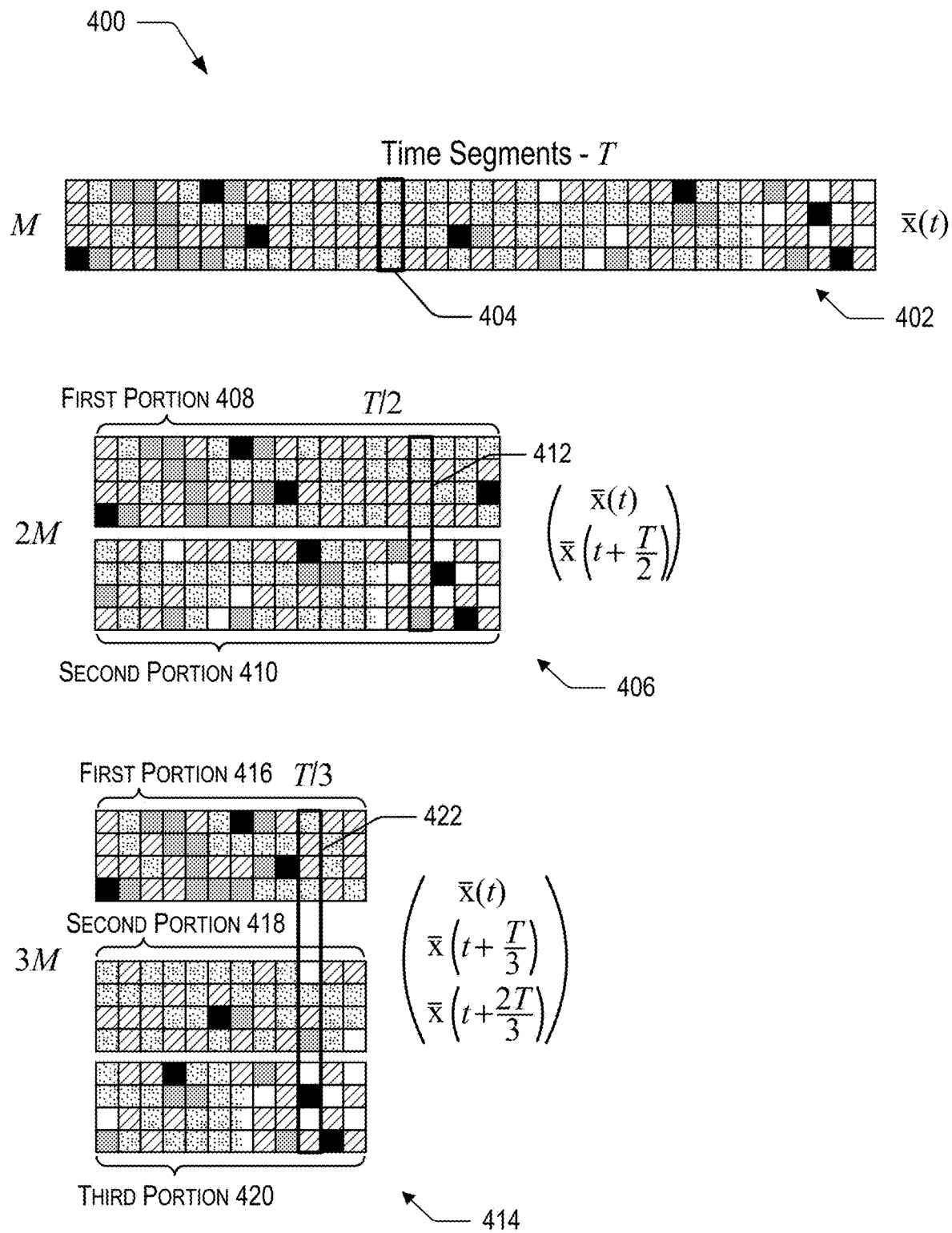
FIG. 4 is a schematic illustration showing an example of how frames that include normalized audio signals associated with multiple microphones may be combined to estimate a position of an audio source, in accordance with one or more examples.

For example, consider FIG. 4, which provides an example 400 of how frames that include normalized audio signals associated with multiple microphones may be combined to estimate a position of an audio source, in accordance with the examples described herein. A first group of frames 402 are shown, with rows M each corresponding to a normalized amplitude of a signal from a particular microphone 304(1)-304(n) in the microphone array 302, and columns each corresponding to an individual time segment T in a time period. A frame 404 in the first group of frames 402 may include normalized amplitudes of an audio signal, as represented by different patterns and/or colors within the individual boxes. The normalization component 316 may represent the frame 404 as a vector of normalized amplitudes, as described above. The first group of frames 404 represents vectors that have not been combined with other vectors to form larger frames.

A second group of frames 406 similarly includes rows corresponding to normalized amplitudes of signals from individual microphones, and columns corresponding to individual time segments. The second group of frames 406 may represent the total time period of the combined time segments T divided by 2 (e.g., T/2). The combination component 318 may combine a vector from a first portion 408 of the second group of frames 406 with a vector from a second portion 410 of the second group of frames 406 to form a combined frame 412. Accordingly, the combined frame 412 simulates twice the number of microphones (e.g., 2M) than were used to capture the audio signal using the combined vectors.

The time period may be divided into any number of portions to generate a frame having normalized amplitudes from each of the portions. For example, a third group of frames 414 also includes rows corresponding to normalized amplitudes of signals from individual microphones, and columns corresponding to individual time segments. The third group of frames 414 may represent the total time period of the combined time segments T divided by 3 (e.g., T/3). The combination component 318 may combine a vector from a first portion 416 of the third group of frames 414, with a vector from a second portion 418 of the third group of frames 414, with a vector from a third portion 420 of the third group of frames 414, to form a combined frame 422. Therefore, the combined frame 422 simulates three times the number of microphones (e.g., 3M) than were used to capture the audio signal using the combined vectors.

Returning to FIG. 3, the localization component 320 receives the combined amplitude representative of the audio emitted by the audio source, and estimates a position of the audio source relative to the device and/or the microphone array 302 based at least in part on the combined amplitude. In some examples, the localization component 320 may determine the estimated position by leveraging motion of the microphone array 302 itself. For instance, the localization component 320 may determine a rotation and/or a translation of the headset 100 (or the HMD 200) between a first time period and a second time period, such as while the audio controller 306 determines a combined amplitude over the first time period and a combined amplitude over the second time period. The localization component 320 may utilize the generally stationary combined amplitude of normalized audio signals to determine a location of the audio source making use of motion of the microphone array 302 using techniques such as those described in "Direction of Arrival Estimation Using Microphone Array Processing for Moving Humanoid Robots," V. Tourbabin and B. Rafaely, IEEE/ACM Trans. Audio, Speech, Lang. Proc., Vol. 23(11); p. 2046-2058, November 2015, which is incorporated by reference herein in its entirety. Additional details of an example that makes use of motion of the microphone array are described with reference to FIG. 5. Other techniques for localizing an audio source that may utilize an audio signal with a generally stationary amplitude as generated using the described techniques include, but are not limited to sonar, radar, electromagnetic communication antenna arrays, and so forth.

In some examples, the localization component 320 may be configured to track locations of one or more sound sources over time (e.g., due to movement of a speaker or other sound source throughout the environment). The localization component 320 may compare current sound source location estimates with previous sound source location estimates stored in the data store 308. In some cases, the audio system 300 may recalculate sound source location estimates on a periodic schedule, such as every 500 milliseconds, every second, every two seconds, and so on. In response to a change in a sound source location estimate for a sound source, the localization component 320 may determine that the sound source moved. In some examples, the localization component 320 may additionally or alternatively detect a change in location of a sound source based on visual information received from the headset 100, the HMD 200, and/or some other external source. Thus, in some examples, the localization component 320 may determine location of one or more audio sources based on audio information from the microphone array 302, visual information from one or more cameras, and/or other sensor data from one or more other sensors of the headset 100, the HMD 200, and/or other sources. The localization component 320 may track the movement of one or more sound sources over time, and in some cases, may store values for a number of sound sources and a location of each sound source at multiple points in time. In examples, the localization component 320 may calculate an estimate of the localization variance, which may be used as a confidence level for determinations of changes in movement.

Although the techniques described above relate generally to utilizing a transform, such as an STFT, to normalize segments of an audio signal, other techniques are also considered. For example, the audio controller 306 may utilize a beamforming technique to normalize the audio signal, alternatively or in addition to the STFT technique described herein. In examples, the beamforming component 322 may be configured to form multiple beams, where an individual beam of the multiple beams represents an audio signal in the environment surrounding the audio system 300. The beamforming component 322 may determine, based on the multiple beams, multiple directions from which the audio signals originate relative to the microphone 304(1) that captured the audio signals. In examples, the beamforming component 322 determines a direction of the multiple direction that has a higher response value than other directions from which signals were received, and/or a desired response value (e.g., 600 Hz, 800 Hz, 1000 Hz, etc.) which may be associated with speech or another desired sound. The beamforming component 322 may select the signal that has the highest and/or desired response value to normalize the signals received from individual microphones in each time segment. For instance, the normalization component 316 may use an amplitude of a signal selected by the beamforming component 322 in Equation 4 above, in place of $\hat{s}(t)$.

Additionally, in some cases, the beam forming component 322 may be configured to process one or more ATFs to selectively emphasize sounds from sound sources within a selected area while de-emphasizing sounds from other areas. In analyzing sounds detected by the microphone array 302, the beamforming component 322 may combine information from different acoustic sensors to emphasize sound associated from a particular region of the local area of the environment while deemphasizing sound outside of the region. The beamforming component 322 may isolate an audio signal associated with sound from a particular sound source from other sound sources in the local area based on, for example, different DOA estimates from the DOA estimation component 310. The beamforming component 322 may thus selectively analyze discrete sound sources in the local area. In some examples, the beamforming component 322 may enhance a signal from a sound source. For instance, the beamforming component 322 may apply sound filters which eliminate signals above, below, or between certain frequencies. Signal enhancement acts to enhance sounds associated with a given identified sound source relative to other sounds detected by the microphone array 302.

In some examples, the performance optimization component 324 may control how many of the microphones 304 in the microphone array 302 are utilized to localize audio in the local area of the environment based on performance of the microphones 304. For instance, the performance optimization component 324 may receive an estimate of the localization variance from the localization component 320, may receive metrics relating to coloration or ambience, may receive metrics relating to health of one or more of the microphones 304, and so forth, and use one or more of these metrics to determine a localization performance of the microphones 304. The performance optimization component 324 may compare the localization performance of the microphones 304 to a localization performance threshold. In examples, the localization performance threshold may correspond to localization performance when the microphone array 302 is stationary (e.g., within 5%, 10%, 20%, etc. of the stationary performance), a minimum performance threshold based on a location of the audio source (e.g., within 1 meter of the audio source), or the like.

The performance optimization component 324 may use less than all (e.g., decrease the number) of the microphones 304 in the microphone array 302 if the localization performance is greater than the performance threshold, thus reducing computation and/or power consumption of the microphone array 302. The performance optimization component 324 may track localization performance over time, and increase the number of microphones 304 used to receive audio signals if the localization performance goes below the localization performance threshold. Of course, examples are considered in which the number of microphones 304 used to receive audio signals is increased if the localization performance is above the localization performance threshold, and the number of microphones 304 used to receive audio signals is decreased if the localization performance is below the localization performance threshold. Alternatively or additionally, the performance optimization component 324 may modify how many of the microphones 304 are used to capture audio of the environment based on whether power consumption of the headset 100 and/or the audio system 300 is above or below a threshold. For example, if the audio system 300 is consuming more than a threshold amount of power (e.g., greater than 200 mW), the performance optimization component 324 may reduce the number of the microphones 304 that are in use to reduce the power being consumed by the audio system 300.

Figure 5:
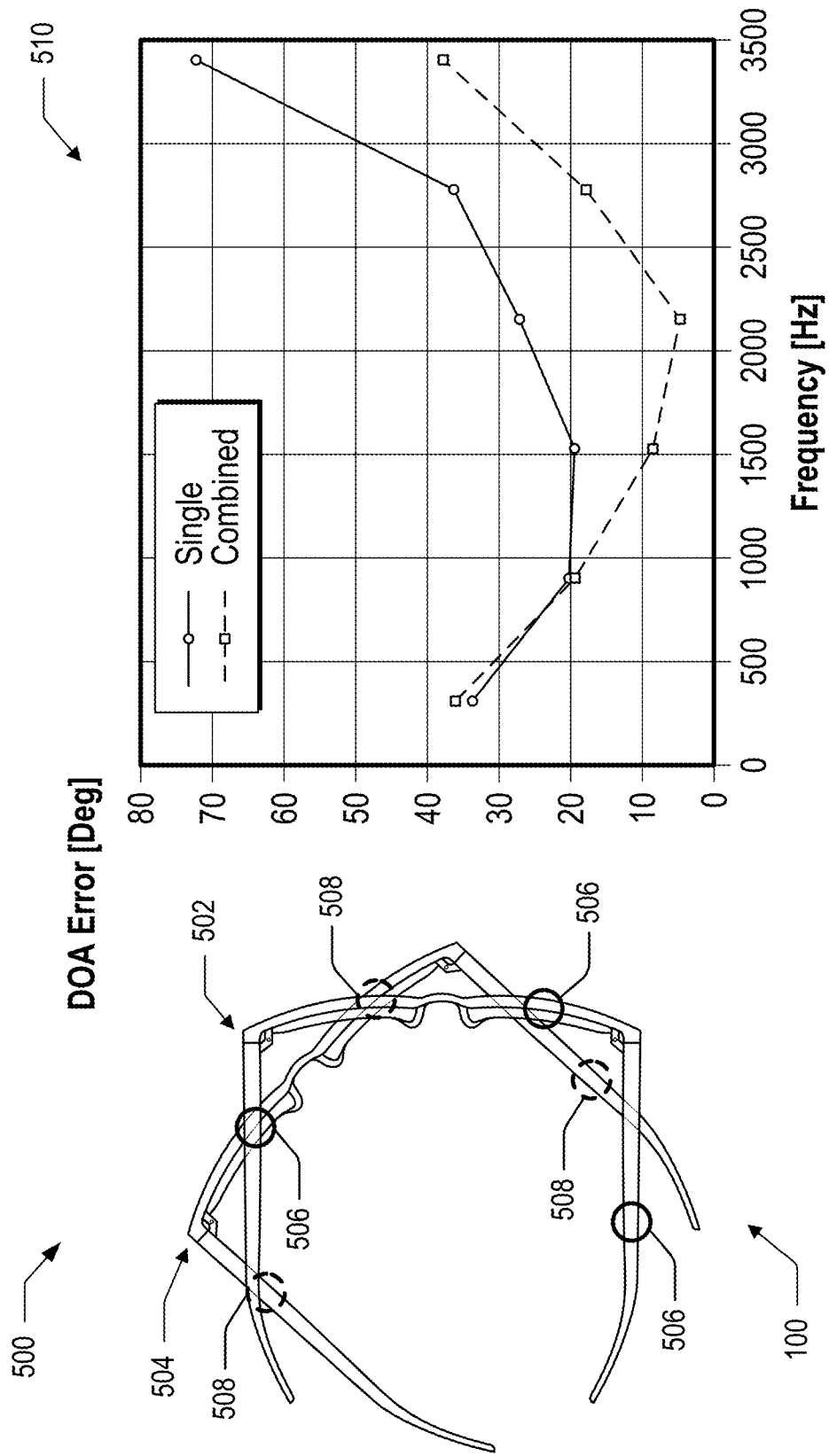
FIG. 5 is a schematic illustration of showing an example of how the described techniques may be incorporated into motion-based enhancement to localize an audio source.

FIG. 5 is a schematic illustration of showing an example 500 of how the described techniques may be incorporated into motion-based enhancement to localize an audio source. For instance, the example 500 illustrates the headset 100 of FIG. 1 in a first pose 502 which may correspond to a first time, and the headset 100 in a second pose 504 which may correspond to a second time. As used herein, a pose corresponds to a position and/or orientation of an object (e.g., the headset 100) relative to a coordinate system. The coordinate system in the example 500 may be relative to a fixed location in the environment, or some other location. The headset 100 may, in some cases, experience a rotation and/or a translation from the first pose 502 at the first time to the second pose 504 at the second time. In the example 500 as illustrated, the sensor arrays 110 are located at the circles 506 indicated in solid lines in the first pose 502, and are located at the circles 508 indicated in dashed lines in the second pose 504. The sensor array(s) 110 may determine the rotation and/or translation of the headset 100, and generate information based at least in part on the rotation and/or translation from the first time to the second time to be used in determining a location of an audio source relative to the headset 100.

In some examples, as described above, the localization component 320 described in relation to FIG. 3 may receive one or more combined amplitudes representative of the audio emitted by the audio source. For example, the localization component 320 may determine a combined amplitude based on a first vector of normalized amplitudes received at the first time when the headset 100 is in the first pose 502, a second vector of normalized amplitudes received at the second time when the headset is in the second pose 504, and so forth. In some cases, the localization component 320 may assume that the location of the sound source is relatively constant over the time segments, although examples are considered in which motion of the audio source in space are accounted for when localizing the audio source. The localization component 320 may estimate a location of the audio source relative to the coordinate frame (or some other location, such as the headset 100) based at least in part on the combined amplitude and the rotation and/or translation of the headset 100 between the first pose 502 to the second pose 504. In examples, the localization component 320 may refine the location estimate of the audio source over time as additional combined amplitudes and poses of the headset 100 are determined, such as by averaging the location estimates for the audio source.

In some cases, the localization component 320 may determine a location of the audio source using a combined vector of normalized amplitudes to generate a spatial spectrum for the time period associated with the combined vector. Similar to the discussion above, the spatial spectrum may indicate an amplitude of energy arriving at the microphone array 302 from different directions (e.g., in degrees on a 360-degree scale) relative to the microphone array 302. By normalizing the amplitudes over a time period in this subsequent spatial spectrum, the localization component 320 may more accurately determine a DOA of the audio from the audio source than the instantaneous DOA. This is because the amplitude of the audio in the combined vector is generally stationary over the time period and thus reduces variability of the sound energy in the spatial spectrum, as opposed to varying sound energy captured by the microphone array 302 at instances in time directly. The localization component 320 may select a direction that corresponds to a peak in the spatial spectrum generated using the combined vector of normalized amplitudes for the DOA of the audio to localize the audio source.

In examples, the incorporation of normalized, combined audio signals in localizing an audio source according to the described techniques may reduce error in audio source localization. For instance, consider a plot 510 that illustrates a signal frequency (Hz, x-axis) versus DOA error (Degrees, y-axis) for an example audio system having a microphone array without motion enhancement, and an example audio system having a microphone array and utilizing the described motion enhancement, normalization, and combination techniques. As shown, the described techniques that utilize normalization and combination of audio signals to localize an audio source may have reduced error generally in the frequency range of 1000 Hz and above. Accordingly, the described techniques that utilize normalization and combination of audio signals to localize an audio source may be used to effectively localize speech audio signals, for example, which ranges generally from 100 Hz to 8,000 Hz in frequency.

Figure 6:
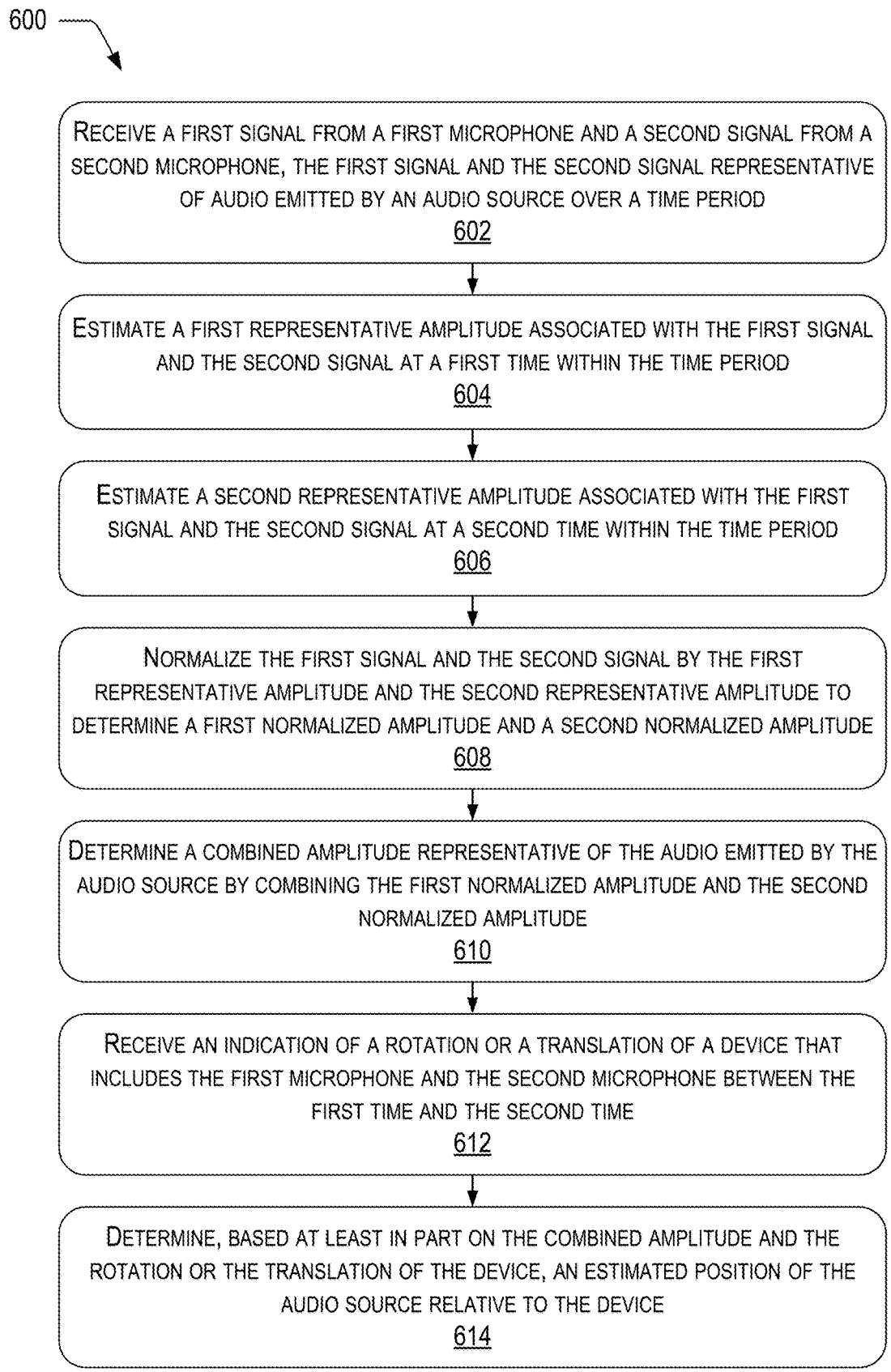
FIG. 6 is a flowchart of an example process for localizing an audio source, in accordance with one or more examples.

FIG. 6 is a flowchart of an example process 600 for localizing an audio source, in accordance with one or more examples. The process 600 may be performed by components of an audio system (e.g., audio system 300). As described above, the audio system 300 may be a component of an electronic device (e.g., the headset 100 and/or the HMD 200) configured to localize, by performing the process 600, an audio source by normalizing and combining audio signals. In some examples, the audio system performs the process 600 for one or more microphones of one or more microphone arrays. Any of the steps included in the process 600 may be performed by other computing devices, such as a remote computing device or server computing device. In some cases, the process 600 may include different and/or additional steps, or perform the steps in a different order than described herein.

In some examples, the process 600 includes an operation 602, in which the audio system receives a first signal from a first microphone and a second signal from a second microphone, where the first signal and the second signal are representative of audio emitted by an audio source over a time period. For instance, the audio controller 306 may receive a first audio signal from the microphone 304(1), and may also receive a second audio signal from the microphone 304(2). In some cases, the audio controller 306 may receive greater than or fewer than two audio signals from corresponding microphones. The microphone 304(1) and the microphone 304(2) may be located in a same microphone array 302, or in some examples may be in different microphone arrays at different locations on the electronic device or a different device.

An operation 604 includes the audio system estimating a first representative amplitude associated with the first signal and the second signal at a first time within the time period. In some examples, the audio controller 306 may utilize a transfer function, such as an STFT, to transfer the first signal and the second signal into respective segments associated with the first time in a frequency domain. The audio controller 306 may then determine the representative amplitude for the first time based on the first signal, the second signal, the transfer function associated with a DOA of the first signal and the second signal, and the number of microphones, such as according to Equation (3) above. Alternatively or additionally, the audio controller 306 may use a beamforming technique to select an amplitude of a particular frequency at the first time to normalize the first signal and the second signal, as described above.

An operation 606 includes the audio system estimating a second representative amplitude associated with the first signal and the second signal at a second time within the time period. Similar to the discussion above in relation to the operation 604, the audio controller 306 may utilize a transfer function, such as an STFT, to transfer the first signal and the second signal into respective segments associated with the second time in a frequency domain. The audio controller 306 may then determine the representative amplitude for the second time based on the first signal, the second signal, the transfer function associated with a DOA of the first signal and the second signal, and the number of microphones, such as according to Equation (3) above. Alternatively or additionally, the audio controller 306 may use a beamforming technique to select an amplitude of a particular frequency at the second time to normalize the first signal and the second signal, as described above.

An operation 608 includes normalizing the first signal and the second signal by the first representative amplitude to determine a first normalized amplitude, and normalizing the first signal and the second signal by the second representative amplitude to determine a second normalized amplitude. In examples, the audio controller 306 may utilize the first representative amplitude to normalize the first signal and the second signal at the first time, and utilize the second representative amplitude to normalize the first signal and the second signal at the second time, such as according to Equation (4) above. In some cases, the audio controller 306 stores multiple normalized amplitudes corresponding to multiple microphones for a particular time segment in a vector. The vector may include a number of elements based on the number of microphones used to receive the audio signal.

An operation 610 includes determining a combined amplitude representative of the audio emitted by the audio source by combining the first normalized amplitude and the second normalized amplitude. For instance, the audio controller 306 may generate a first vector of normalized amplitudes for a first time, a second vector of normalized amplitudes for a second time, and so forth as described above. The audio controller 306 may combine multiple vectors that include normalized amplitudes into a single vector, or frame, while retaining the normalized amplitude values within the larger vector.

An operation 612 includes receiving an indication of a rotation or a translation of a device that includes the first microphone and the second microphone between the first time and the second time. In some cases, the audio controller 306 may receive positioning information from one or more position sensors (e.g., position sensor(s) 716 described in relation to FIG. 7) indicating a location of the electronic device that includes the audio controller 306 in an environment. The audio controller 306 may track the positioning information over time to determine how the location of the electronic device changes, such as due to movement of a user wearing the electronic device. The audio controller 306 may use known positions of the microphone array(s) 302 relative to the position sensor(s) 716 to determine rotation or translation of the microphone array(s) 302 of the electronic device.

An operation 614 includes determining, based at least in part on the combined amplitude and the rotation or the translation of the device, an estimated position of the audio source relative to the device. For example, the audio controller 306 may utilize the combined amplitude, being generally stationary, in localization techniques such as motion-based enhancement that rely on a stationary amplitude to improve localization determinations.

Example System Environment

Figure 7:
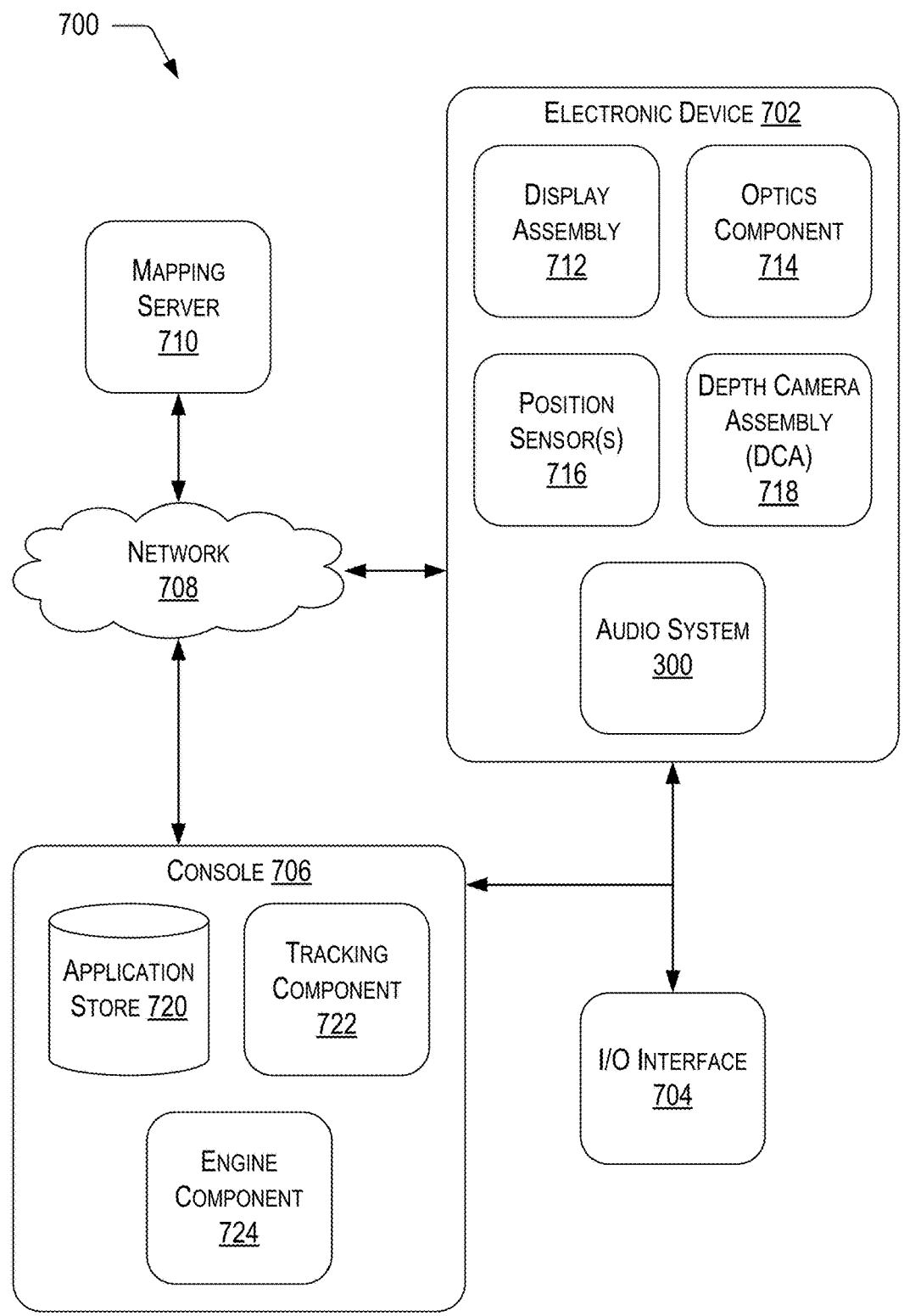
FIG. 7 is a block diagram of an example artificial reality system environment, in accordance with one or more examples.

FIG. 7 is a block diagram of an example system environment 700 for localizing an audio source, in accordance with one or more examples. The example system environment 700 may comprise an artificial reality environment (e.g., a virtual reality environment, an augmented reality environment, a mixed reality environment, or some combination thereof). The example system environment 700 includes an electronic device 702, an input/output (I/O) interface 704 that is coupled to a console 706, a network 708, and a mapping server 710. In some examples, the electronic device 702 correspond to the headset 100 of FIG. 1, the HMD 200 of FIG. 2, one or more hearing aids, a mobile device, a tablet, a vehicle, or some other type of computing device that is configured to localize an audio signal according to the described techniques.

While FIG. 7 shows an example system environment 700 including one electronic device 702 and one I/O interface 704, examples are considered in which any number of these components may be included in the example system environment 700. For example, there may be multiple electronic devices each having an associated I/O interface 704, with each electronic device and I/O interface 704 communicating with the console 706. In some cases, different and/or additional components may be included in the example system environment 700. Functionality described in relation to one or more of the components shown in FIG. 7 may be distributed among the components in a different manner than described herein. For example, some or all of the functionality of the console 706 may be provided by the electronic device 702.

The electronic device 702 may include a display assembly 712, an optics component 714, one or more position sensors 716, and a depth camera assembly (DCA) 718. Some examples of the electronic device 702 have different components than those described in relation to FIG. 7. Additionally, the functionality provided by various components described in relation to FIG. 7 may be differently distributed among the components of the electronic device 702 in some examples, or be captured in separate assemblies remote from the electronic device 702.

In examples, the display assembly 712 displays content to a user in accordance with data received from the console 706. The display assembly 712 may display the content using one or more display elements (e.g., the display elements 104). A display element may be, for instance, an electronic display. In some examples, the display assembly 712 may comprise a single display element or multiple display elements (e.g., a display for each eye of a user). Examples of an electronic display include, but are not limited to, a liquid crystal display (LCD), an organic light emitting diode (OLED) display, an active-matrix organic light-emitting diode display (AMOLED), a waveguide display, or some combination of these display types. In some examples, the display assembly 712 may also be configured to perform some or all of the functionality of the optics component 714.

The optics component 714 may magnify image light received from the display assembly 712, correct optical errors associated with the image light, and present the corrected image light to one or both eyeboxes of the electronic device 702. In some examples, the optics component 714 includes one or more optical elements such as an aperture, a Fresnel lens, a convex lens, a concave lens, a filter, a reflecting surface, or any other suitable optical element that can affect image light. In some cases, the optics component 714 may include combinations of different optical elements. In some examples, one or more of the optical elements in the optics component 714 may be coated by one or more coatings, such as partially reflective or anti-reflective coatings.

Magnification and focusing of the image light by the optics component 714 allows an electronic display of the display assembly 712 to be physically smaller, weigh less, and consume less power than larger displays. Additionally, magnification by the optics component 714 may increase the field of view of the content presented by the electronic display. For example, the electronic display may display content in the field of view such that the displayed content is presented using almost all (e.g., approximately 110 degrees diagonal), and in some cases, all of a user's field of view. Additionally, in some examples, an amount of magnification may be adjusted by adding or removing optical elements of the optics component 714.

In some embodiments, the optics component 714 may be designed to correct one or more types of optical error. Examples of optical error include, but are not limited to, barrel or pincushion distortion, longitudinal chromatic aberrations, transverse chromatic aberrations, spherical aberrations, chromatic aberrations, or errors due to the lens field curvature, astigmatisms, and so forth. In some examples, content provided to the electronic display for display to a user may be pre-distorted, and the optics component 714 may correct the distortion after receiving image light associated with the content.

The position sensor 716 may be configured to generate data indicating a position of the electronic device 702. In some examples, the position sensor 716 generates one or more measurement signals in response to motion of the electronic device 702. The position sensor(s) 716 may include one or more of an IMU, accelerometer, gyroscope, magnetometer, another suitable type of sensor that detects motion, or some combination thereof. In some cases, the position sensor 716 may include multiple accelerometers to measure translational motion (forward/back, up/down, left/right) and multiple gyroscopes to measure rotational motion (e.g., pitch, yaw, roll). In some examples, the position sensors 716 include an IMU that rapidly samples measurement signals and calculates an estimated position of the electronic device 702 from the sampled data. For example, the IMU may integrate the measurement signals received from the accelerometers over time to estimate a velocity vector and integrate the velocity vector over time to determine an estimated position of a reference point on the electronic device 702 that describes a position of the electronic device 702 in the environment. The reference point may be defined as a point in space and/or defined as a point within the electronic device 702.

In some examples, the DCA 718 generates depth information for an environment surrounding the electronic device 702. The DCA 718 may include one or more imaging devices, an illuminator, and a DCA controller (not shown). Operation and structure of the DCA 718 is described above with regard to FIG. 1.

The audio system 300 may localize an audio source based, in part, on normalized and combined audio signals. The audio system 300 receives, from one or more microphones of the electronic device 702, signals representative of audio emitted by an audio source over a time period. In examples, the audio system 300 estimates amplitudes of the signals at at least a first time within the time period and at a second time within the time period. The audio system 300 normalizes the amplitudes associated with the first and second times to generate normalized amplitudes. In examples, the audio system 300 determines a combined amplitude representative of the audio emitted by the audio source by combining the normalized amplitudes. The audio system 300 may determine, based at least in part on the combined amplitude, an estimated position of the audio source relative to the electronic device 702. As described above with respect to FIG. 3, the audio system 300 may comprise at least one microphone array 302 that includes one or more microphones 304, and an audio controller 306. The audio system 300 may include other components than those described herein.

In addition to localizing an audio source, the audio system 300 may perform other functions as well. In some examples, the audio system 300 may request acoustic parameters from the mapping server 710 over the network 708. The acoustic parameters may describe one or more acoustic properties (e.g., room impulse response, a reverberation time, a reverberation level, etc.) of the environment. The audio system 300 may provide information describing at least a portion of the environment from the DCA 718 and/or location information for the electronic device 702 from the position sensor 716. The audio system 300 may generate one or more sound filters using one or more of the acoustic parameters received from the mapping server 710, and use the sound filters to provide audio content to the user.

The I/O interface 704 may be a device that allows a user to send action requests and receive responses from the console 706. In some examples, an action request may be an instruction to start or end capture of image or video data, or an instruction to perform a particular action within an application. The I/O interface 704 may include one or more input devices, such as a keyboard, a mouse, a game controller, or any other suitable device for receiving action requests and communicating the action requests to the console 706. In examples, an action request received by the I/O interface 704 is communicated to the console 706, which performs an action corresponding to the action request. In some examples, the I/O interface 704 includes an IMU that captures calibration data indicating an estimated position of the I/O interface 704 relative to an initial position of the I/O interface 704. In some examples, the I/O interface 704 may provide haptic feedback to the user in accordance with instructions received from the console 706. For example, haptic feedback is provided when an action request is received, or the console 706 communicates instructions to the I/O interface 704 causing the I/O interface 704 to generate haptic feedback when the console 706 performs an action.

In examples, the console 706 provides content to the electronic device 702 for processing in accordance with information received from one or more of the DCA 718, the electronic device 702, and/or the I/O interface 704. In the example shown in FIG. 7, the console 706 includes an application store 720, a tracking component 722, and an engine component 724. Some examples of the console 706 have additional and/or different components than those described in relation to FIG. 7. Additionally, the functions described below may be distributed among components of the console 706 in a different manner than described in relation to FIG. 7. In some examples, the functionality discussed herein with respect to the console 706 may be implemented in the electronic device 702, and/or a remote system.

The application store 720 may store one or more applications for execution by the console 706. An application is a group of instructions, that when executed by a processor, generates content for presentation to the user. Content generated by an application may be in response to inputs received from the user via movement of the electronic device 702 and/or the I/O interface 704. Examples of applications include, but are not limited to, gaming applications, conferencing applications, video playback applications, or other suitable applications.

In some examples, the tracking component 722 tracks movements of the electronic device 702 and/or of the I/O interface 704 using information from the DCA 718, the one or more position sensors 716, or some combination thereof. For example, the tracking component 722 determines a position of a reference point of the electronic device 702 in a mapping of a local area of an environment based on information from the electronic device 702. The tracking component 722 may also determine positions of an object or virtual object. Additionally, in some examples, the tracking component 722 may use data indicating a position of the electronic device 702 from the position sensor 716 as well as representations of the local area from the DCA 718 to predict a future location of the electronic device 702. The tracking component 722 may provide the estimated or predicted future position of the electronic device 702 and/or the I/O interface 704 to the engine component 724.

The engine component 724 may execute applications and receive position information, acceleration information, velocity information, predicted future positions, or some combination thereof, of the electronic device 702 from the tracking component 722. Based on the received information, the engine component 724 may determine content to provide to the electronic device 702 for presentation to the user. For example, if the received information indicates that the user has looked to the left, the engine component 724 may generate content for the electronic device 702 that mirrors the user's movement in a virtual local area or in a local area augmenting the local area with additional content. Additionally, the engine component 724 may perform an action within an application executing on the console 706 in response to an action request received from the I/O interface 704 and provide feedback to the user that the action was performed. The provided feedback may be visual or audible feedback via the electronic device 702, or haptic feedback via the I/O interface 704.

In some examples, the network 708 couples the electronic device, the console 706, and the mapping server 710. The network 708 may include any combination of local area and/or wide area networks using both wireless and/or wired communication systems. For example, the network 708 may include the Internet and/or mobile telephone networks. In some cases, the network 708 uses standard communications technologies and/or protocols. Hence, the network 708 may include links using technologies such as Ethernet, 802.11, worldwide interoperability for microwave access (WiMAX), 2G/3G/4G/5G mobile communications protocols, digital subscriber line (DSL), asynchronous transfer mode (ATM), InfiniBand, PCI Express Advanced Switching, and so forth. The networking protocols used on the network 708 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and so on. The data exchanged over the network 708 may be represented using technologies and/or formats including image data in binary form (e.g. Portable Network Graphics (PNG)), hypertext markup language (HTML), extensible markup language (XML), and the like. In examples, all or some information may be encrypted using encryption technologies such as secure sockets layer (SSL), transport layer security (TLS), virtual private networks (VPNs), Internet Protocol security (IPsec), and so on.

The mapping server 710 may include a database that stores a virtual model describing a plurality of spaces, where a location in the virtual model corresponds to a current configuration of a local area of the electronic device 702. The mapping server 710 may receive, from the electronic device 702 via the network 708, information describing at least a portion of the environment surrounding the electronic device 702 and/or location information for the environment surrounding the electronic device 702. A user may adjust privacy settings to allow or prevent the electronic device 702 from transmitting information to the mapping server 710. In some examples, the mapping server 710 determines, based on the received information and/or location information, a location in the virtual model that is associated with the local area of the environment where the electronic device 702 is located. The mapping server 710 may determine (e.g., retrieve) one or more acoustic parameters associated with the local area, based in part on the determined location in the virtual model and any acoustic parameters associated with the determined location. The mapping server 710 may transmit the location of the local area and values of acoustic parameters associated with the local area to the electronic device 702.

One or more components of the example system environment 700 may contain a privacy component that stores one or more privacy settings for user data elements. The user data elements describe the user and/or the electronic device 702. For example, the user data elements may describe a physical characteristic of the user, an action performed by the user, a location of the user of the electronic device 702, a location of the electronic device 702, an HRTF for the user, and so forth. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some examples, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The example system environment 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description has been presented for illustration; it is not intended to be exhaustive or to limit the scope of the disclosure to the precise forms disclosed. Persons skilled in the relevant art can appreciate that many modifications and variations are possible considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the steps, operations, or processes described herein may be performed or implemented with one or more hardware or software modules, alone or in combination with other devices. In examples, a software module is implemented with a computer program product comprising a computer-readable medium containing computer program code, which can be executed by a computer processor for performing any or all the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   at an electronic device that includes a microphone array including at least a first microphone and a second microphone:
   receiving, via the first microphone, a first signal representative of audio emitted by an audio source over a time period;
   receiving, via the second microphone, a second signal representative of the audio emitted by the audio source over the time period;
   estimating a first amplitude associated with the first signal and the second signal for a first time within the time period;
   estimating a second amplitude associated with the first signal and the second signal for a second time within the time period, the second time being different than the first time;
   normalizing the first signal and the second signal at the first time by the first amplitude to determine a first normalized amplitude;
   generating a first vector that include a first set of elements, wherein the first vector includes the first normalized amplitude associated with the first time;
   normalizing the first signal and the second signal at the second time by the second amplitude to determine a second normalized amplitude;
   generating a second vector that include a second set of elements, wherein the second vector includes the second normalized amplitude;
   determining a combined amplitude representative of the audio emitted by the audio source by combining the first normalized amplitude and the second normalized amplitude, wherein the combined amplitude includes a third vector comprising the first set of elements and the second set of elements; and
   estimating, based at least in part on the combined amplitude, a position of the audio source relative to the device.

2. The method of claim 1, wherein the time period is a first time period, the method further comprising:
   receiving, from the first microphone, a third signal representative of the audio emitted by the audio source over a second time period;
   receiving, from the second microphone, a fourth signal representative of the audio emitted by the audio source over the second time period;
   determining a change in pose of the device between the first time period and the second time period; and
   determining, based at least in part on the third signal, the fourth signal, the change in pose, and the position, an updated position of the audio source relative to the device associated with the second time period.

3. The method of claim 1, further comprising:
   forming multiple beams representative of audio signals in an environment surrounding the device, the audio signals including the first signal and the second signal;
   determining, based at least in part on the multiple beams, multiple directions from which the audio signals originate relative to the microphone array;
   determining that a direction of the multiple directions has a higher response value than other directions of the multiple directions; and
   determining that the first signal and the second signal are associated with the direction,
   wherein normalizing the first signal and the second signal at the first time comprises normalizing the first signal and the second signal by an amplitude of the first signal and the second signal associated with the direction, and normalizing the first signal and the second signal at the second time comprises normalizing the first signal and the second signal by the amplitude of the first signal and the second signal associated with the direction.

4. The method of claim 1, further comprising:
   transforming the first signal and the second signal to a frequency domain using a short-time Fourier transform (STFT),
   wherein estimating the first amplitude is based at least in part on determining a frequency associated with the first signal and the second signal in the frequency domain at the first time, and
   wherein estimating the second amplitude is based at least in part on determining the frequency associated with the first signal and the second signal in the frequency domain at the second time.

5. The method of claim 4, further comprising:
   separating the first signal and the second signal into a first portion of the first signal and the second signal associated with the first time and a second portion of the first signal and the second signal associated with the second time,
   wherein transforming the first signal and the second signal to the frequency domain comprises transforming the first portion and the second portion separately using the STFT.

6. The method of claim 1, further comprising:
   generating a spatial spectrum based at least in part on the first signal and the second signal, the spatial spectrum indicating an amount of energy arriving at the microphone array from different directions;
   determining a maximum value in the spatial spectrum; and
   determining an instantaneous direction of arrival of the audio based at least in part on the maximum value in the spatial spectrum,
   wherein estimating the first amplitude and estimating the second amplitude are further based on the instantaneous direction of arrival.

7. The method of claim 1, further comprising:
   determining a localization performance of multiple microphones corresponding to determining the position of the audio source relative to the device;
   comparing the localization performance of the multiple microphones to a localization performance threshold; and
   responsive to determining that the localization performance of the multiple microphones is greater than the localization performance threshold, using less than all of the multiple microphones to receive signals representative of audio emitted by the audio source.

8. The method of claim 1, wherein the audio source corresponds to human speech having a varying amplitude over the time period.

9. One or more non-transitory computer-readable media storing instructions that, when executed by one or more processors, cause the one or more processors to perform operations comprising:
   receiving, from a first microphone of a microphone array of a device, a first signal representative of audio emitted by an audio source;
   receiving, from a second microphone of the microphone array of the device, a second signal representative of the audio emitted by the audio source;

estimating a first amplitude associated with the first signal and the second signal for a first time;

estimating a second amplitude associated with the first signal and the second signal for a second time, the second time being different than the first time;

normalizing the first signal and the second signal at the first time by the first amplitude to determine a first normalized amplitude;

generating a first vector that include a first set of elements, wherein the first vector includes the first normalized amplitude associated with the first time;

normalizing the first signal and the second signal at the second time by the second amplitude to determine a second normalized amplitude;

generating a second vector that include a second set of elements, wherein the second vector includes the second normalized amplitude associated with the second time;

determining a combined amplitude by combining the first normalized amplitude and the second normalized amplitude, wherein the combined amplitude includes a third vector comprising the first set of elements and the second set of elements; and estimating, based at least in part on the combined amplitude, a position of the audio source relative to the device.

10. The one or more non-transitory computer-readable media of claim 9, the operations further comprising:

transforming the first signal and the second signal to a frequency domain using a short-time Fourier transform (STFT), wherein estimating the first amplitude is based at least in part on determining a frequency associated with the first signal and the second signal in the frequency domain at the first time, and wherein estimating the second amplitude is based at least in part on determining the frequency associated with the first signal and the second signal in the frequency domain at the second time.

11. The one or more non-transitory computer-readable media of claim 10, the operations further comprising:

separating the first signal and the second signal into a first portion of the first signal and the second signal associated with the first time and a second portion of the first signal and the second signal associated with the second time, wherein transforming the first signal and the second signal to the frequency domain comprises transforming the first portion and the second portion separately using the STFT.

12. The one or more non-transitory computer-readable media of claim 9, the operations further comprising:

generating a spatial spectrum based at least in part on the first signal and the second signal, the spatial spectrum indicating an amount of energy arriving at the microphone array from different directions;

determining a maximum value in the spatial spectrum; and determining an instantaneous direction of arrival of the audio based at least in part on the maximum value in the spatial spectrum, wherein estimating the first amplitude and estimating the second amplitude are further based on the instantaneous direction of arrival.

13. An electronic device comprising:

a microphone array comprising a first microphone and a second microphone;

one or more processors; and one or more computer-readable media storing instructions that, when executed by the one or more processors, cause the one or more processors to perform operations comprising:

receiving, from the first microphone, a first signal representative of audio emitted by an audio source;

receiving, from the second microphone, a second signal representative of the audio emitted by the audio source;

estimating a first representative amplitude of the audio based at least in part on the first signal and the second signal associated with a first time;

estimating a second representative amplitude of the audio based at least in part on the first signal and the second signal associated with a second time, the second time being different than the first time;

normalizing the first signal and the second signal by the first representative amplitude to determine a first normalized amplitude;

generating a first vector that include a first set of elements, wherein the first vector includes the first normalized amplitude associated with the first time;

normalizing the first signal and the second signal by the second representative amplitude to determine a second normalized amplitude;

generating a second vector that include a second set of elements, wherein the second vector includes the second normalized amplitude associated with the second time;

determining a combined amplitude by combining the first normalized amplitude and the second normalized amplitude, wherein the combined amplitude includes a third vector comprising the first set of elements and the second set of elements; and estimating, based at least in part on the combined amplitude, a position of the audio source relative to the electronic device that includes the microphone array.

14. The electronic device of claim 13, wherein the first time and the second time are within a first time period, the operations further comprising:

receiving, from the first microphone, a third signal representative of audio emitted by the audio source over a second time period;

receiving, from the second microphone, a fourth signal representative of the audio emitted by the audio source over the second time period;

determining a change in pose of the electronic device between the first time period and the second time period; and determining, based at least in part on the third signal, the fourth signal, the change in pose of the electronic device, and the position, an updated position of the audio source relative to the electronic device associated with the second time period.

15. The electronic device of claim 13, the operations further comprising:

forming multiple beams representative of audio signals in an environment surrounding the device, the audio signals including the first signal and the second signal;

determining, based at least in part on the multiple beams, multiple directions from which the audio signals originate relative to the microphone array;

determining that a direction of the multiple directions has a higher response value than other directions of the multiple directions; and determining that the first signal and the second signal are associated with the direction, wherein normalizing the first signal and the second signal at the first time comprises normalizing the first signal and the second signal by an amplitude of the first signal and the second signal associated with the direction, and normalizing the first signal and the second signal at the second time comprises normalizing the first signal and the second signal by the amplitude of the first signal and the second signal associated with the direction.

16. The electronic device of claim 13, wherein the microphone array comprises multiple microphones including the first microphone and the second microphone, the operations further comprising:

determining a localization performance of the multiple microphones corresponding to determining the position of the audio source relative to the electronic device;

comparing the localization performance of the multiple microphones to a localization performance threshold; and responsive to determining that the localization performance of the multiple microphones is greater than the localization performance threshold, using less than all of the multiple microphones to receive signals representative of audio emitted by the audio source.

17. The electronic device of claim 13, wherein the audio source corresponds to human speech having a varying amplitude.

18. The electronic device of claim 13, the operations further comprising:

transforming the first signal and the second signal to a frequency domain using a short-time Fourier transform (STFT), wherein estimating the first amplitude is based at least in part on determining a frequency associated with the first signal and the second signal in the frequency domain at the first time, and wherein estimating the second amplitude is based at least in part on determining the frequency associated with the first signal and the second signal in the frequency domain at the second time.

19. The electronic device of claim 13, the operations further comprising:

separating the first signal and the second signal into a first portion of the first signal and the second signal associated with the first time and a second portion of the first signal and the second signal associated with the second time, wherein transforming the first signal and the second signal to the frequency domain comprises transforming the first portion and the second portion separately using the STFT.

20. The electronic device of claim 13, the operations further comprising:

generating a spatial spectrum based at least in part on the first signal and the second signal, the spatial spectrum indicating an amount of energy arriving at the microphone array from different directions;

determining a maximum value in the spatial spectrum; and determining an instantaneous direction of arrival of the audio based at least in part on the maximum value in the spatial spectrum, wherein estimating the first amplitude and estimating the second amplitude are further based on the instantaneous direction of arrival.

* * * * *